United States Patent
Yoon et al.

(10) Patent No.: US 10,862,627 B2
(45) Date of Patent: Dec. 8, 2020

(54) NON-ORTHOGONAL BASED UPLINK TRANSMISSION METHOD AND APPARATUS

(71) Applicant: ELECTRONICS AND TELECOMMUNICATIONS RESEARCH INSTITUTE, Daejeon (KR)

(72) Inventors: Chanho Yoon, Daejeon (KR); Young Jo Ko, Daejeon (KR); Seung-Kwon Baek, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 15 days.

(21) Appl. No.: 16/094,317

(22) PCT Filed: May 18, 2017

(86) PCT No.: PCT/KR2017/005178
§ 371 (c)(1),
(2) Date: Oct. 17, 2018

(87) PCT Pub. No.: WO2017/209418
PCT Pub. Date: Dec. 7, 2017

(65) Prior Publication Data
US 2019/0140775 A1    May 9, 2019

(30) Foreign Application Priority Data

May 31, 2016  (KR) .................. 10-2016-0067607
May 17, 2017  (KR) .................. 10-2017-0061274

(51) Int. Cl.
*H04L 1/00*    (2006.01)
*H04W 72/04*   (2009.01)

(52) U.S. Cl.
CPC ......... *H04L 1/0071* (2013.01); *H04L 1/0041* (2013.01); *H04W 72/0413* (2013.01)

(58) Field of Classification Search
CPC . H04L 1/0071; H04L 1/0041; H04W 72/0413
See application file for complete search history.

(56) References Cited

U.S. PATENT DOCUMENTS

| 8,498,357 | B2 | 7/2013 | Jung et al. |
| 8,649,462 | B2 | 2/2014 | Jang et al. |
| 8,848,763 | B2 | 9/2014 | Han et al. |
| 9,166,758 | B2 * | 10/2015 | Lee ............... H04L 5/0053 |

(Continued)

FOREIGN PATENT DOCUMENTS

| CA | 2575528 A1 | 2/2006 |
| KR | 10-1421592 B1 | 8/2014 |

(Continued)

OTHER PUBLICATIONS

Unjung Heo, "The BER performance Improvement for IDMA systems in Overloaded Environments", Master's Thesis, Department of Information and Communications Engineering, KAIST, 2010.

(Continued)

*Primary Examiner* — Duc C Ho
(74) *Attorney, Agent, or Firm* — LRK Patent Law Firm

(57) ABSTRACT

A terminal receives allocation of a unique first identifier of the terminal from a base station. The terminal generates first uplink data. The terminal applies interleaving based on the first identifier to the first uplink data to generate second uplink data.

4 Claims, 8 Drawing Sheets

Divide Uplink Bit Data (*e.g.*, Output of Channel Encoder (Tx110)) into a Plurality of Bit Groups    (S1)

Apply Concatenated Interleaving (*e.g.*, Interleaving of Equation 1) to Each of the Plurality of Bit Groups    (S2)

(56) References Cited

U.S. PATENT DOCUMENTS

| | | |
|---|---|---|
| 9,572,140 B2 | 2/2017 | Han et al. |
| 9,900,869 B2 | 2/2018 | Han et al. |
| 2005/0243940 A1 | 11/2005 | Huh et al. |
| 2013/0163537 A1* | 6/2013 | Anderson ......... H04W 72/1284 370/329 |
| 2014/0071916 A1 | 3/2014 | Yoon et al. |
| 2015/0244398 A1 | 8/2015 | Mouhouche et al. |
| 2015/0381318 A1 | 12/2015 | Zhang et al. |
| 2016/0295608 A9 | 10/2016 | Jung et al. |
| 2018/0132230 A1 | 5/2018 | Han et al. |

FOREIGN PATENT DOCUMENTS

| | | |
|---|---|---|
| KR | 10-2015-0099396 A | 8/2015 |
| WO | 2006/015269 A1 | 2/2006 |
| WO | 2011/108822 A2 | 9/2011 |

OTHER PUBLICATIONS

"Ran1 Chairman's Notes" 3GPP TSG RAN WG1 Meeting #86bis, Lisbon, Portugal Oct. 10-14, 2016.
ETRI, "Signature pattern generation of LSSA", 3GPP TSG-RAN1#86, R1-167339, Gothenburg, Sweden, Aug. 22-26, 2016.
Chanho Yoon et al., "User specific ID/signature based short deterministic interleavers for non-orthogonal transmission systems", Electronics Telecommunications Research Institute, 2017.
Search Report, dated Jul. 24, 2017, for International Application No. PCT/KR2017/005178.
Written Opinion, dated Jul. 24, 2017, for International Application No. PCT/KR2017/005178.

* cited by examiner

NON-ORTHOGONAL BASED UPLINK TRANSMISSION METHOD AND APPARATUS

CROSS-REFERENCE TO RELATED APPLICATIONS

The present application is a U.S. National Phase entry from International Application No. PCT/KR2017/005178, filed May 18, 2017, which claims priority to Korean Patent Application Nos. 10-2016-0067607, filed May 31, 2016, and 10-2017-0061274, filed May 17, 2017, the disclosures of which are incorporated by reference herein in their entireties.

BACKGROUND OF THE INVENTION

1. Technical Field

The present invention relates to a non-orthogonality based uplink transmission method and apparatus.

2. Description of Related Art

An uplink (UL) of a conventional cellular network is configured based on orthogonality transmission. The orthogonality transmission signifies that resources between terminals do not overlap each other with respect to time, frequency, or code. Therefore, a base station receives an uplink transmission signal of a terminal using an independent resource, and demodulates a user signal transmitted by one terminal without interference with another user signal. However, to perform an orthogonality-guaranteed uplink transmission between the terminals, the uplink transmission of all terminals must be operated depending on control and scheduling information of the base station. That is, the base station has to directly notify the terminal of allocation of a time, frequency, or code resource, and all terminals have to receive the allocation result. Therefore, when the terminal has data to transmit through the uplink, ① it first has to transmit a scheduling request (SR) to the base station. After this, the base station receives the SR, and ② transmits scheduling information (or grant information) including time information (or frequency information and code information), a data size, a modulation method, and a channel coding rate to all terminals. Hence, the orthogonality-based uplink system has to accompany ① and ②, thereby increasing a delay up to a point where an actual uplink transmission is performed, and power consumption. Particularly, when the amount of data to be transmitted through the uplink by the terminal is relatively small, the SR process and the grant process serve as high overhead.

Further, the uplink transmission time must be controlled to guarantee the orthogonality of the uplink, and transmission timing alignment must be performed before the SR process is performed.

Therefore, a non-orthogonality based uplink transmission method is needed.

SUMMARY OF THE INVENTION

The present invention has been made in an effort to provide a non-orthogonality based uplink transmission method and apparatus.

An exemplary embodiment of the present invention provides an uplink transmission method of a terminal. The uplink transmission method of a terminal includes: receiving allocation of a unique first identifier of the terminal from a base station; generating first uplink data; and generating second uplink data by applying interleaving based on the first identifier to the first uplink data.

The generating of second uplink data may include: generating a plurality of parameters by using the first identifier; generating first data by applying interleaving based on a first parameter from among the plurality of parameters to the first uplink data; and generating second data by applying interleaving based on a second parameter from among the plurality of parameters to the first data.

The generating of a plurality of parameters may include dividing bits of the first identifier into a plurality of bit sets; and using decimal values expressed by the plurality of bit sets as values of the plurality of parameters.

The generating of first uplink data may include generating the first uplink data by applying channel coding and spreading to bit data.

The uplink transmission method may further include generating third uplink data by applying scrambling based on the first identifier to the second uplink data.

The uplink transmission method may further include: generating fourth uplink data by applying modulation to the third uplink data; and generating fifth uplink data by applying phase rotation based on the first identifier to the fourth uplink data.

The uplink transmission method may further include generating a preamble based on the first identifier.

The uplink transmission method may further include determining a length of zero padding for the second uplink data based on a distance between the terminal and the base station.

Another embodiment of the present invention provides an uplink transmission method of a terminal. The uplink transmission method of a terminal may include: dividing uplink data into a plurality of bit groups; applying interleaving based on a unique identifier of the terminal to a first bit group of the plurality of bit groups; and applying interleaving based on the unique identifier to a second bit group of the plurality of bit groups.

The applying of interleaving based on the unique identifier to the first bit group may include: extracting a plurality of parameters from the unique identifier; generating first data by applying interleaving based on a first parameter from among the plurality of parameters to the first bit group; and generating second data by applying interleaving based on a second parameter from among the plurality of parameters to the first data.

The extracting of a plurality of parameters may include: dividing bits of the unique identifier into a plurality of bit sets; and using decimal values expressed by the plurality of bit sets as values of the plurality of parameters.

Yet another embodiment of the present invention provides a transmitter. The transmitter includes: a channel encoder for generating uplink data through channel coding; and a signature unit for extracting a plurality of parameters from a unique identifier, applying interleaving based on a first parameter from among the plurality of parameters to the uplink data to generate first data, and applying interleaving based on a second parameter from among the plurality of parameters to the first data to generate second data.

Advantageous Effects

According to an exemplary embodiment of the present invention, the non-orthogonal uplink transmission method and the identifier information-based terminal distinguishing are used, so the terminal does not need to perform a request process for additional scheduling and a process for receiving a grant. Through this, the delay time and power consumption can be reduced.

Further, according to an exemplary embodiment of the present invention, the non-orthogonal multiplexing method that is appropriate for a grant-free scheme can be provided.

According to an exemplary embodiment of the present invention, the process for controlling the transmission time can be omitted, thereby reducing the delay time and power consumption.

According to an exemplary embodiment of the present invention, an excellent element technique of 5th generation communication can be provided.

DETAILED DESCRIPTION OF THE INVENTION

Figure 1:
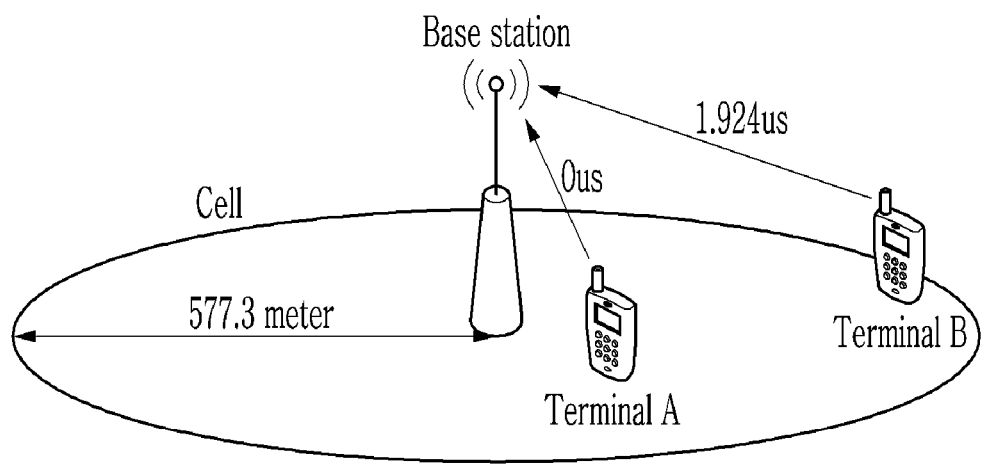
FIG. 1 shows a propagation delay difference for respective terminals in a viewpoint of a base station.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification, redundant description of the same constituent elements is omitted.

Also, in this specification, it is to be understood that when one component is referred to as being "connected" or "coupled" to another component, it may be connected or coupled directly to the other component or may be connected or coupled to the other component with another component intervening therebetween. On the other hand, in this specification, it is to be understood that when one component is referred to as being "connected or coupled directly" to another component, it may be connected or coupled to the other component without another component intervening therebetween.

It is also to be understood that the terminology used herein is only used for the purpose of describing particular embodiments, and is not intended to limit the invention.

Singular forms are to include plural forms unless the context clearly indicates otherwise.

It will be further understood that terms "comprises" and "have" used in the present specification specify the presence of stated features, numerals, steps, operations, components, parts, or a combination thereof, but do not preclude the presence or addition of one or more other features, numerals, steps, operations, components, parts, or a combination thereof.

Also, as used herein, the term "and/or" includes any plurality of combinations of items or any of a plurality of listed items. In this specification, 'A or B' may include 'A', 'B', or 'A and B'.

In the present specification, a terminal may designate a mobile terminal, a mobile station, an advanced mobile station, a high reliability mobile station, a subscriber station, a portable subscriber station, an access terminal, user equipment (UE), a machine-type communication device (MTC), and the like, and it may include the entire or some of functions of the mobile terminal, the mobile station, the advanced mobile station, the high reliability mobile station, the subscriber station, the portable subscriber station, the access terminal, the user equipment, the MTC, and the like.

A base station (BS) may designate an advanced base station, a high reliability base station (HR-BS), a node B (NB), an evolved node B (eNB), a new radio (NR) node B (gNB), an access point, a radio access station, a base transceiver station, a mobile multihop relay (MMR)-BS, a relay station functioning as a base station, a high reliability relay station functioning as a base station, a repeater, a macro base station, a small base station, a femto base station, a home node B (HNB), a home eNB (HeNB), a pico base station (pico BS), a micro base station (micro BS), and the like, and it may include the entire or some of functions of the advanced base station, the HR-BS, the node B, the eNB, the gNB, the access point, the radio access station, the base transceiver station, the MMR-BS, the relay station, the high reliability relay station, the repeater, the macro base station, the small base station, the femto base station, the HNB, the HeNB, the pico base station, the micro base station, and the like.

The present invention relates to a multiplexing scheme for a physical layer of a wireless mobile communication system.

When a terminal performs uplink transmission in a licensed band, the existing wireless transmission system controls interference between terminals through control by a base station. That is, the uplink is configured in a form for guaranteeing orthogonal transmission between terminals.

However, the present invention relates to a method for a terminal to determine an uplink transmission time without control by a base station and perform an uplink transmission. That is, the present invention relates to a non-orthogonal uplink transmission method without guaranteeing orthogonality between terminals. Further, the present invention relates to a method for a base station to receive an uplink signal and identify the same when a terminal performs non-orthogonality uplink transmission.

Hereinafter, rather than a method for terminals using a same uplink resource to transmit an uplink signal to the base station based on the SR and grant information transmitted by the base station, a method for the terminal to apply a signature to the uplink signal and configure and transmit the uplink signal according to a non-orthogonal scheme will be described. Further, a method for applying a unique signature for each terminal to the uplink transmission will be described. In addition, a method for demodulating a non-orthogonal signal based on a unique signature for each terminal will be described.

FIG. 1 shows a propagation delay difference (or a transmission time difference) for respective terminals in a viewpoint of a base station. A propagation delay difference for respective terminals is generated by a geographical distance difference between the base station and the terminal. In detail, FIG. 1 shows a case in which a radius of a cell provided by a base station is 577.3 m.

As shown in FIG. 1, when there are a terminal A that is nearest to the cell (or the base station) and a terminal B that is farthest from the same from among the terminals, a transmission signal time difference between the terminals (terminals A and B) is about 1.924 µs because of the limit of the speed of light.

When there is a time difference (e.g., 1.924 µs) between the signals transmitted by the two terminals, it is assumed that the base station receives signals and demodulates them, while maintaining the time difference. Here, the time difference is 3.849 µs (=2×1.924 µs) by a round-trip delay when the base station performs downlink transmission and then performs transmission. In this case, when a cyclic prefix (CP) or a guard band is insufficient, the orthogonality between the uplink signals transmitted by the two terminals is destroyed, so a demodulation error may occur.

Therefore, for timing alignment, the terminal performs random access for transmitting a signal to the base station ①. ② The base station transmits a synchronous signal that is a reference to the terminal. ③ The terminal receives the synchronous signal transmitted by the base station, ④ and transmits a response signal to a reference synchronous signal to the base station. ⑤ The base station notifies the terminal of a control value of a transmission time. As described, it is possible to control the transmission time of the terminal when five processes are passed through. However, it increases delay and power consumption to perform the five processes.

Therefore, when the terminals for transmitting signals through the uplink in the licensed band performs non-orthogonal and contention-based uplink transmission using the same resource, the process for receiving grant information after transmitting the SR may be omitted. Further, when an asynchronous system requiring no control of the transmission time of the uplink is provided, additional overhead, delay, and power consumption may be reduced. However, the present licensed band cellular system has no solution for the non-orthogonal-based uplink transmission (hereinafter, non-orthogonal transmission), or for by what method the non-orthogonal transmission is performed. Further, a solution for the transmission method and the receiving method generating no problem when uplink transmission times for respective terminals are different is needed.

Hereinafter, a method for performing uplink transmission by use of non-orthogonal multiplexing based on identifier information in a radio communication cellular system will now be described.

For the non-orthogonal transmission, unique identifiers are assigned for respective terminals. That is, each terminal may receive allocation of a unique identifier (hereinafter, terminal unique identifier) from the base station.

The terminal acquires downlink (DL) frame timing information that is a reference to the base station through a synchronization and system information description signal transmitted by the base station. The terminal may analogize uplink frame timing information with reference to the acquired downlink frame timing information.

When acquiring the uplink frame timing information, the terminal transmits a registration request to the base station according to uplink frame timing. The terminal receives a temporary terminal identifier for notifying success of the registration from the base station. For example, the temporary terminal identifier may be a C-RNTI (cell-radio network temporary identifier) of n-bit information.

When a bit signal sequence to be transmitted by the terminal is interleaved, the n-bit (e.g., 16-bit) identifier information may be used as ① a parameter (e.g., a parameter for a process of S120) of an interleaver, ② a parameter (e.g., a parameter for a process of S131) of a sequence for sequence multiplication on a bit level or a symbol level, or ③ a parameter (e.g., a parameter for a process of S132) for determining a sequence of the synchronous signal.

Figure 2:
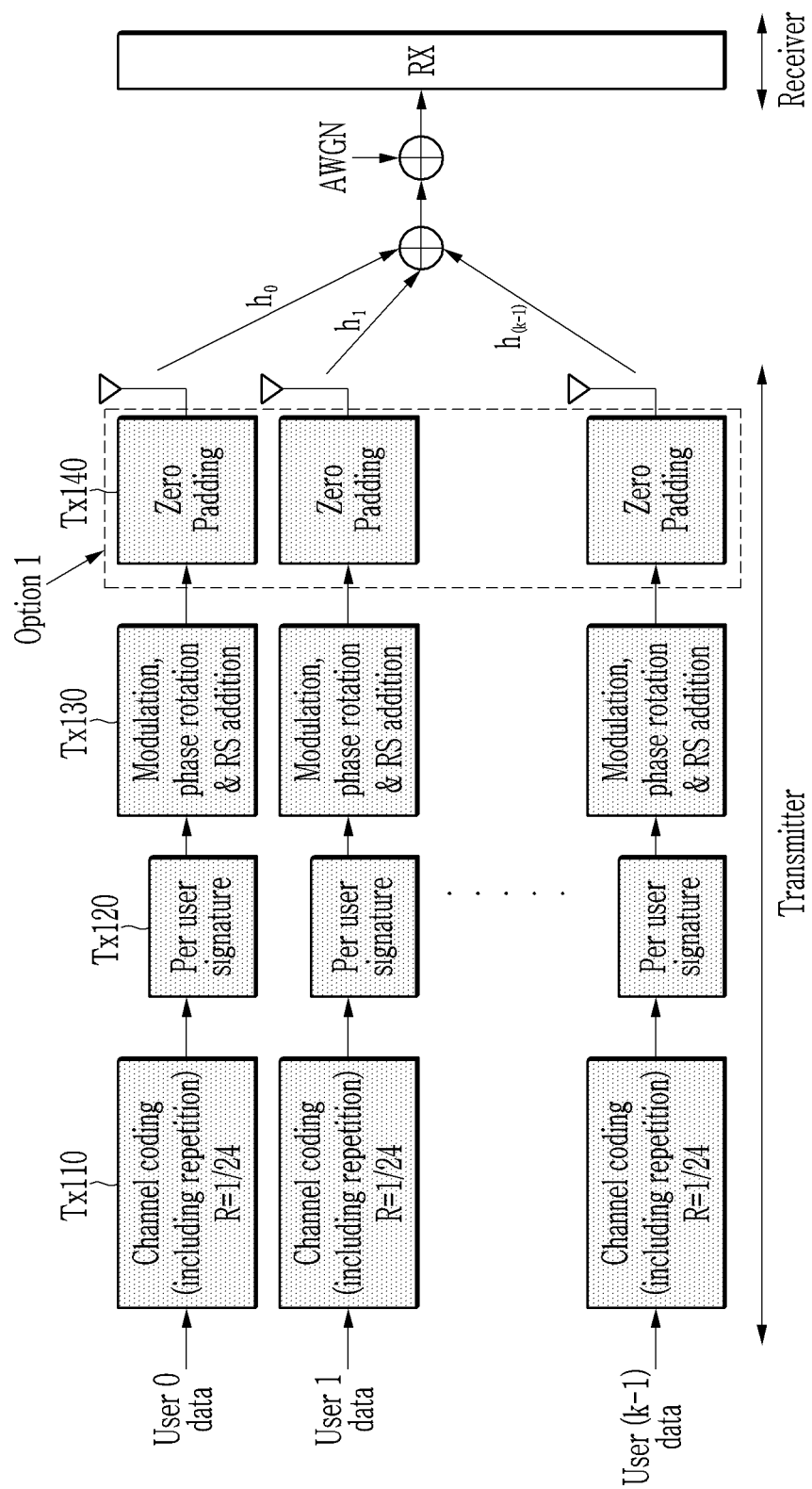
FIG. 2 and FIG. 3 show a transmitter of each terminal when a plurality of terminals transmit signals through an uplink according to an exemplary embodiment of the present invention.
Figure 3:
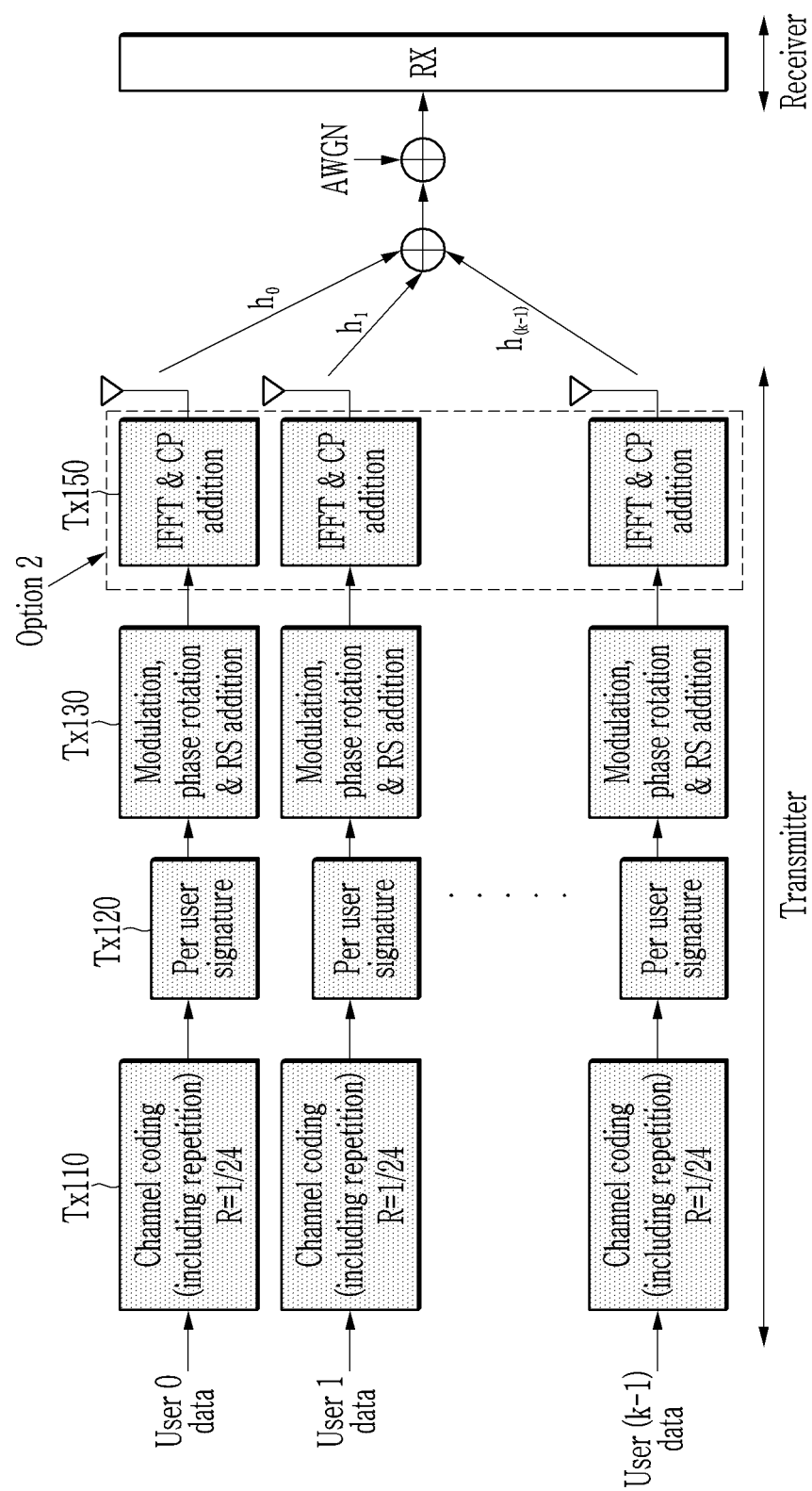

FIG. 2 and FIG. 3 show a transmitter of each terminal when a plurality of (e.g., k) terminals (or users) transmit signals through an uplink according to an exemplary embodiment of the present invention.

In detail, FIG. 2 and FIG. 3 show a configuration of an uplink transmitter based on a non-orthogonal unique identifier. FIG. 2 shows an uplink transmitter for single carriers, and FIG. 3 shows an uplink transmitter for multi-carriers. FIG. 2 and FIG. 3 exemplify a case in which a channel coding rate is R=1124.

The signals transmitted by k transmitters are respectively passed through the uplink channel (e.g. $h_0, h_1, \ldots, h_{(k-1)}$) and are combined to each other, and the combined signal is combined to additive white Gaussian noise (AWGN). The combined signal is received by a receiver (e.g., a receiver of the base station).

The transmitter shown in FIG. 2 includes a channel encoder Tx110, a signature unit Tx120, a modulator Tx130, and a padding unit Tx140. The transmitter shown in FIG. 3 includes a channel encoder Tx110, a signature unit Tx120, a modulator Tx130, and a padding unit Tx150.

First, bit information (e.g., data of the user 0, data of the user 1, and data of the user k−1) of the user (or the terminal) may be input to the channel encoder Tx110 with a low code rate.

1. Process for the Channel Encoder Tx110 to Perform Channel Coding (S110)

As shown in FIG. 2, the channel encoder Tx110 has a very low coding rate (R=1/24). R=1/24 is an example, and the channel encoder Tx110 may have different coding rates.

The channel encoder Tx110 may be replaced with the channel coding unit Tx111 and the spreading unit Tx112. In detail, the channel encoder Tx110 may apply channel coding and spreading to bit data to generate uplink data. For example, when the final coding rate is R=1/24, the channel coding unit Tx111 may have the coding rate R=1/12 and the spreading unit Tx112 may perform 12-times spreading. For another example, when the final coding rate is R=1/24, the channel coding unit Tx111 may have the coding rate R=1/3 and the spreading unit Tx112 may perform 8-times spreading. For another example, when the final coding rate is R=1/24, the channel coding unit Tx111 may have the coding rate R=1/4 and the spreading unit Tx112 may perform 6-times spreading. For another example, when the final coding rate is R=1/24, the channel coding unit Tx111 may have the coding rate R=1/6 and the spreading unit Tx112 may perform 4-times spreading. For another example, when the final coding rate is R=1/24, the channel coding unit Tx111 may have the coding rate R=1/12 and the spreading unit Tx112 may perform 2-times spreading The sequence applied to spreading may be different for each spreading rate. For example, when the spreading factor is 2 (i.e., $S_F=2$), the sequence applied to spreading may be w=[+1 −1]. For another example, when the spreading factor is 4 (i.e., $S_F=4$), the sequence applied to spreading may be w=[+1 −1 +1 −1]. For another example, when the spreading factor is 6 (i.e., $S_F=6$), the sequence applied to spreading may be w=[+1 −1 +1 −1 +1 −1]. For another example, when the spreading factor is 8 (i.e., $S_F=8$), the sequence applied to spreading may be w=[+1 −1 +1 −1 +1 −1 +1 −1]. For another example, when the spreading factor is 12 (i.e., $S_F=12$), the sequence applied to spreading may be w=[+1 −1 +1 −1 +1 −1 +1 −1 +1 −1 +1 −1].

A signature is applied to the terminal bit input to which channel coding (or channel coding and spreading) is applied by the channel encoder Tx110 based on the unique identifier information provided to the terminal from the base station. The process S120 for applying unique identifier information to the output of the channel encoder Tx110 as a signature is performed as two processes S121 and S122.

2. Process for the Signature Unit Tx120 to Apply First Identifier Information to an Output of the Channel Encoder Tx110 as a Signature (S120)

2.1. Process for the Signature Unit Tx120 to Perform an Identifier Information-Based Parameterization and Perform Interleaving (or Permutation) (S121)

The signature unit Tx120 applies an interleaving based on a unique identifier of the terminal to the output (e.g., uplink data generated by the channel encoder Tx110) of the channel encoder Tx110.

When the identifier of the terminal is unique, the interleaver applied to the terminal is unique. There are various identifiers, so a method for designing the interleaver to correspond to the identifier one by one may be inefficient.

Instead, a method for parameterizing single identifier information and performing interleaving may be used. Through this, the terminal and the base station do not need to store information on an interleaving pattern.

Regarding the method for parameterizing the identifier information and applying the same to the interleaving, the parameters belonging to the identifier information respectively correspond to block interleaving.

In detail, Equation 1 expresses a method for concatenating a plurality of block interleavings and performing the same when the identifier allocated to the terminal is parameterized and the parameters belonging to the identifier correspond to the block interleavings one by one.

Further, information (bit sequence) input to the interleaver Tx121 of the signature unit Tx120 may have a predetermined length irrespective of a total information length (total bit length). The longer a unit length of the bit sequence input to the interleaver Tx121 becomes, the higher a degree of freedom of a point (position) where a bit order is remapped through the interleaving becomes. However, the number of cases for the designated point (position) increases as much as that, so the complexity of its realization increases. Therefore, when the entire bit sequence length is divided into a plurality of bundles by the length of $L_{itlv}$ expressed in Equation 1 and interleaving is applied to the limited section, complexity of realization is lowered, and a fixed interleaver generating method becomes possible. Further, to increase the interleaving speed, a high-speed interleaver for applying a plurality of interleavings to the length of $L_{itlv}$ may be realized.

The interleaver Tx121 of the signature unit Tx120 performs interleaving based on Equation 1.

$$d_0((a_3+i) \bmod L_{itlv})=b(i)$$

$$d_1((L_{itlv}/2) \cdot (i \bmod 2)+\lfloor i/2 \rfloor)=d_0(i)$$

$$d_2(3a_2+i) \bmod L_{itlv})=d_1(i)$$

$$d_3(2\lfloor i/2 \rfloor+((i+L_{itlv}-\lfloor i/2 \rfloor) \bmod 2))=d_2(i)$$

$$d_4((5a_1+i) \bmod L_{itlv})=d_3(i)$$

$$d_5(i)=d_4((L_{itlv}/4) \cdot (i \bmod 4)+\lfloor i/4 \rfloor)$$

$$d_6((7a_0+i) \bmod L_{itlv})=d_5(i)$$

$$d_{out}(i)=d_6(v(i)),\ i=\lfloor z \bmod L_{itlv},\ z=0,1,2,\ldots,M \cdot S_F-1 \quad \text{(Equation 1)}$$

In Equation 1, i is index, b( ) is an output of the channel encoder Tx110, and $D=M \cdot S_F$ is a total length of an output bit (e.g., uplink bit level data generated by the channel encoder Tx110) of the channel encoder Tx110. In Equation 1, M represents a size (e.g., a size of an output bit of the channel coding unit Tx111) of the total output bit passing through channel coding, and $d_{out}$ indicates an output of the interleaver Tx121.

In Equation 1, v(i) is a random interleaving sequence, and it may be any random sequence. For example, when it is given as $L_{itlv}=12$, it may be that v(i)={2,8,3,12,10,4,9,1,11,6,5,7}.

Further, the length of $L_{itlv}$ of v(i) may be about a length (e.g., a length of a bit level) corresponding to the bandwidth. For example, when the bandwidth of an orthogonal frequency division multiplexing (OFDM) symbol corresponds to 72 subcarriers and a modulated symbol transmitted by each subcarrier corresponds to a quadrature phase shift keying (QPSK) symbol, $L_{itlv}=144$. In the present specification, a time domain symbol may be an OFDM symbol or a single carrier-frequency division multiple access (SC-FDMA) symbol. However, this is an example, and the present invention may be applicable when the time domain symbol is a symbol that is different from the OFDM symbol and the SC-FDMA symbol. In the present specification, the time domain symbol may be expressed as a symbol.

The terminal may generate a plurality of parameters by using the unique identifier of the terminal. In detail, the signature unit Tx120 may divide the bits belonging to the terminal unique identifier into a plurality of bit sets, and may use decimal values expressed by a plurality of bit sets as values of a plurality of parameters.

For example, a plurality of parameters ($a_0$, $a_1$, $a_2$, $a_3$) may be acquired through n-bit identifier information (e.g., C-RNTI, etc.) provided to the terminal by the base station. In detail, when it is given that n=16, a process for generating $a_0$, $a_1$, $a_2$, and $a_3$ may be based on Equation 2.

$$\begin{aligned} RNTI_{cell} &= [1\ 0\ 1\ 1\ 0\ 0\ 1\ 1\ 0\ 0\ 0\ 1\ 0\ 1\ 0\ 0] \quad \text{(Equation 2)} \\ &= [[1\ 0\ 1\ 1]\ [0\ 0\ 1\ 1]\ [0\ 0\ 0\ 1]\ [0\ 1\ 0\ 0]] \\ &= [a_0\ a_1\ a_2\ a_3] \end{aligned}$$

That is, the n-bit identifier (e.g., RNTI, etc.) is divided into four portions, and a binary number of the divided portion is changed into a decimal number and is mapped on $a_0$, $a_1$, $a_2$, and $a_3$. The interleaving applied to the respective parameters ($a_0$, $a_1$, $a_2$, and $a_3$) is referred to as block interleaving. For example, the interleaver Tx121 may apply interleaving that is based on one (e.g., $a_3$) of a plurality of parameters ($a_0$, $a_1$, $a_2$, and $a_3$) to the output of the channel encoder Tx110 to generate first data (e.g., $d_1(\ )$), and may apply interleaving that is based on another one (e.g., $a_2$) of a plurality of parameters ($a_0$, $a_1$, $a_2$, and $a_3$) to the first data (e.g., $d_1(\ )$) to generate second data (e.g., $d_3(\ )$). The interleaver Tx121 may apply interleaving that is based on another one (e.g., $a_1$) of a plurality of parameters ($a_0$, $a_1$, $a_2$, and $a_3$) to second data (e.g., $d_3(\ )$) to generate third data (e.g., $d_5(\ )$), and may apply interleaving that is based on another one (e.g., $a_j$) of a plurality of parameters ($a_0$, $a_1$, $a_2$, and $a_3$) to third data (e.g., $d_5(\ )$) to generate fourth data (e.g., $d_{out}(\ )$).

In Equation 2, a range of parameters ($a_0$, $a_1$, $a_2$, $a_3$) extracted from n-bit identifier information (e.g., C-RNTI, etc.) is 0-15. In this case, when an identifier-based interleaver is formed, the number of interleavers is $16^4=65536$. A fixed interleaver set may be configured instead of the identifier-based interleaver. For example, when the range of the parameters ($a_0$, $a_1$, $a_2$, and $a_3$) is 0-1, the number of interleavers may be controlled to be $2^4=16$. In this case, the terminal may randomly select one of the fixed interleavers and use it. Through this, it may be changed to select the identifier.

In Equation 1, $D(=M \cdot S_F)$ assumes a multiple of $L_{itlv}$. When the length of D is not a multiple of $L_{itlv}$, a padding bit (e.g., a sequence of bit 0) with a length $n_{padding}$ that is less than $L_{itlv}$ is added so that it may become $((D+n_{padding}) \mod L_{itlv})=0$. Therefore, interleaving is applied for each binary bit vector output by the channel encoder Tx110.

The above-described non-orthogonal multiplexing method may perform multiplexing by an interleaving pattern specific to the user (or terminal). A seed for the interleaving pattern specific to the user (or terminal) is determined based on the terminal identifier (e.g., ID). A method for determining the interleaving pattern is a method for dividing uplink bit data (e.g., an output of the channel encoder Tx110) into a plurality of bit groups and applying the above-described concatenated interleaving (e.g., interleaving of Equation 1) to a plurality of bit groups. For example, the terminal may apply concatenated interleaving based on the terminal unique identifier to one of a plurality of bit groups, and when the concatenated interleaving is finished, it may then apply concatenated interleaving based on the terminal unique identifier to the next bit group.

In addition, a method for not dividing uplink bit data into a plurality of bit groups but applying the above-described concatenated interleaving to the entire uplink bit data may be used.

In Equation 2, the number of decimals $a_0$, $a_1$, $a_2$ and $a_3$ represents how many times the block interleaving is performed. For example, Equation 2 exemplifies a case in which block interleaving is performed four times and random interleaving v(i) is finally performed.

The concatenated interleaving method may not be performed like Equation 1. In detail, Equation 1 may be modified according to the system identifier (e.g., ID) so that the number of times of the concatenated block interleaving may be increased or decreased. In another way, the respective ranges of the decimals $a_0$, $a_1$, $a_2$, and $a_3$ may be controlled.

Concatenated interleaving based on the terminal unique identifier is applied to the data having passed through the channel coding (or channel coding and spreading) of the channel encoder Tx110 so the terminal may perform interleaving by using the unique interleaving pattern of the terminal.

2.2. Process for the Signature Unit Tx120 to Apply Bit-Level Scrambling to an Output (e.g., $d_{out}(\ )$) of the Interleaved Bit Vector (S122)

The scrambler Tx122 of the signature unit Tx120 receives the output (e.g., $d_{out}$) of the interleaver Tx121, and performs scrambling as exemplified in Equation 3. In detail, the scrambler Tx122 may apply scrambling based on the terminal unique identifier (e.g., RNTI) to the output (e.g., data generated by the interleaver Tx121) of the interleaver Tx121.

$$e(i)=(d_{out}(i)+c(i)_{RNTI_{cell}}) \mod 2, \; i=0,1,2,\ldots,D-1 \quad \text{(Equation 3)}$$

In Equation 3, e(i) is an output of the scrambler Tx122.

A function $c(i)_{RNTI_{cell}}$ for generating a pseudo random sequence is generated through Equation 4. In detail, may generate a pseudo random sequence based on the terminal unique identifier (e.g., RNTI).

$$c(i)_{RNTI_{cell}}=(x_1(i+50)+x_2(i+50)) \mod 2$$

$$x_1(i+31)=(x_1(i+3)+x_1(i)) \mod 2$$

$$x_2(i+31)=(x_2(i+3)+x_2(i+2)+x_2(i+1)+x_2(i)) \mod 2, \; i=0, 1,2,\ldots,D-1 \quad \text{(Equation 4)}$$

In Equation 4, an initial shift register value of $x_1(\ )$ is given to be $x_1\, 0=1$, $\{x_1(k)=0, k=1, 2, \ldots, 30\}$. An initial shift register value of $x_2(\ )$ is determined by $$\Sigma_{k=0}^{15} RNTI_{cell}(k) \cdot 2^k = \Sigma_{k=0}^{30} x_2(k) \cdot 2^k.$$

3. Process for a Modulator Tx130 to Perform Modulation, Apply Second Identifier Information Sing Symbol-Level Phase Rotation to a Modulation Result, and Add Third Identifier Information (e.g., Preamble, Pilot, etc.) Based Reference Signal (RS) (S130)

3.1. Process for the Modulator Tx130 to Perform Modulation, and Apply Second Identifier Information Using Symbol-Level Phase Rotation to a Modulation Result (S131)

The modulator Tx130 may apply modulation to a result of the signature unit Tx120, and may apply phase rotation based on the terminal unique identifier (e.g., RNTI) based on the modulation result.

In detail, a vector $s(i)=I+j \cdot Q$ is formed when a modulation process is applied to the binary bit vector having passed through the signature unit Tx120. Symbol-level phase rotation is applied to the vector $s(i)=I+j \cdot Q$.

The modulator Tx130 uses a modulation method (e.g., a BPSK modulation method) shown in Table 1 or a modulation method (e.g., a QPSK modulation method) shown in Table 2.

TABLE 1

| e(i) | $s(i)_I$ | $s(i)_Q$ |
|---|---|---|
| 0 | $1/\sqrt{2}$ | $1/\sqrt{2}$ |
| 1 | $-1/\sqrt{2}$ | $-1/\sqrt{2}$ |

TABLE 2

| e(2 · i), e(2 · i + 1) | $s(i)_I$ | $s(i)_Q$ |
|---|---|---|
| 00 | $1/\sqrt{2}$ | $1/\sqrt{2}$ |
| 01 | $1/\sqrt{2}$ | $-1/\sqrt{2}$ |

TABLE 2-continued

| e(2·i), e(2·i+1) | s(i)_I | s(i)_Q |
|---|---|---|
| 10 | $-1/\sqrt{2}$ | $1/\sqrt{2}$ |
| 11 | $-1/\sqrt{2}$ | $-1/\sqrt{2}$ |

A length of the input bit is i=0, 1, 2, . . . , D−1 in the case of the binary phase shift keying (BPSK), and the length of the input bit is i=0, 1, 2, . . . , D/2−1 in the case of the QPSK. The BPSK and the QPSK are examples, and other modulation methods are usable.

The modulator Tx130 applies symbol-level phase rotation to the modulation result. The phase rotation method of the modulator Tx130 may be based on Equation 5.

$$s'(i) = s(i) \cdot \exp\left(j \cdot a_5 \cdot i \cdot \frac{\pi}{8}\right), i = 0, 1, 2, \ldots, \frac{D}{2} - 1 \quad \text{(Equation 5)}$$

In Equation 5, s'( ) is a result of phase rotation.

In Equation 5, a value of $a_5$ is determined by the terminal unique identifier (e.g., RNTI). For example, $a_5$ may be one of cases given below.

if $((a_0+a_1+a_2+a_3) \bmod 4 == 0)$
  $a_5=2$
else if $((a_0+a_1+a_2+a_3) \bmod 4 == 1)$
  $a_5=2$
else if $((a_0+a_1+a_2+a_3) \bmod 4 == 2)$
  $a_5=1$
else
  $a_5=-1$ 3.2. Process for the Modulator Tx130 to Add Third Identifier Information (e.g., Preamble, Pilot, etc.) Through Insertion of an RS (S132)

As a next process, the modulator Tx130 may generate a preamble and a pilot based on Equation 6. That is, the modulator Tx130 may generate a preamble and a pilot based on the terminal unique identifier (e.g., RNTI).

$$p(n) = \exp\left(-j \cdot ((a_0 + a_1 + a_2 + a_3) \bmod N) \cdot n \cdot (n+1) \cdot \frac{\pi}{N}\right), \quad \text{(Equation 6)}$$

$$n = 0, 1, 2, \ldots, N-1$$

$$p'(n) = p(n + (11 \cdot a_0 + 7 \cdot a_1 + 3 \cdot a_2 + a_3) \bmod N)$$

In Equation 6, p'( ) means a preamble. The preamble p'( ) may be mainly used for synchronization acquisition or channel estimation.

In Equation 6, N corresponds to a length of the Zadoff-Chu sequence. That is, a value of N is formed with a prime number, and the value of N for the preamble and the value of N for the pilot may be different.

Figure 4:
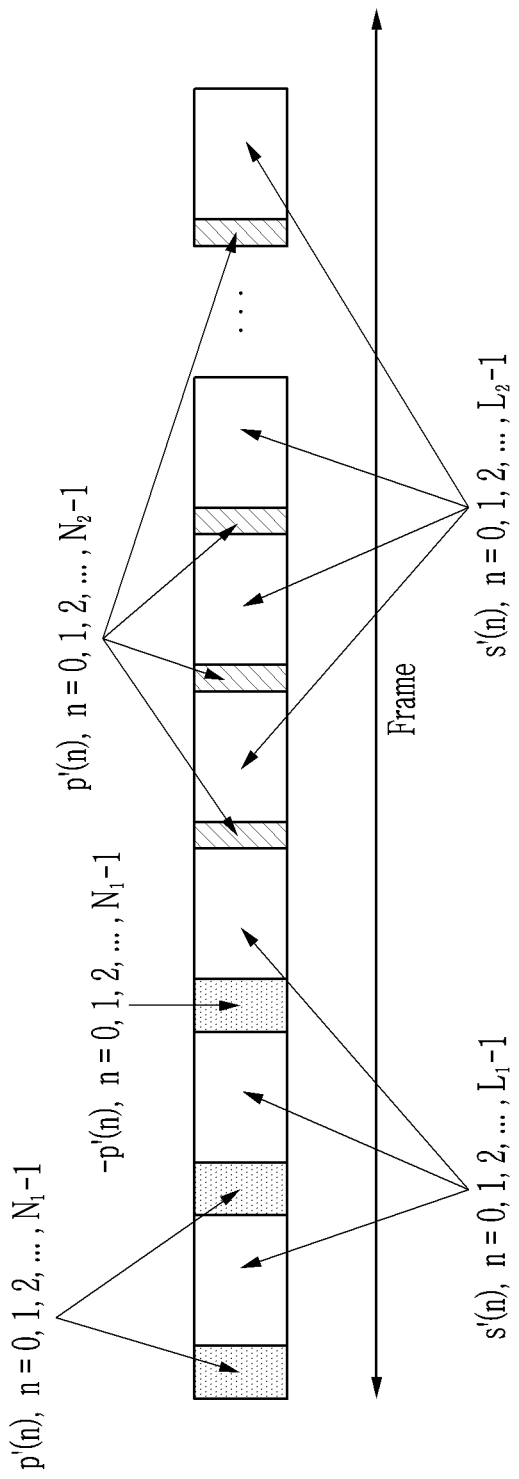
FIG. 4 shows a relationship between a preamble and a pilot in a frame transmitted by a terminal according to an exemplary embodiment of the present invention.

FIG. 4 shows a relationship between a preamble and a pilot in a frame transmitted by a terminal according to an exemplary embodiment of the present invention. In detail, FIG. 4 shows an uplink frame configuration.

Referring to FIG. 4, p'(n) (here, n=0, 1, 2, . . . , $N_1$−1) or −p'(n) (here, n=0, 1, 2, . . . , $N_1$−1) is a reference signal (or pilot) for the preamble (or header), and p'(n) (here, n=0, 1, 2, . . . , $N_2$−1) indicates a reference signal (or pilot) for data.

Referring to FIG. 4, s'(n) (here, n=0, 1, 2, . . . , $L_1$−1) represents a preamble (or header), and s'(n) (here, n=0, 1, 2, . . . , $L_2$−1) denotes data.

The terminal may know $N_1$, $N_2$, $L_1$, and $L_2$ in advance. In another way, the base station may set the $N_1$, $N_2$, $L_1$, and $L_2$ and notify the terminal of them.

4. Process for the Padding Unit Tx140 to Perform Zero Padding for a Single Carrier or for the Padding Unit Tx150 to Perform Inverse Fast Fourier Transform (IFFT) and Cyclic Padding (e.g., Insertion of CP) for a Multi-Carrier (S140)

After the terminal acquires uplink frame timing information through a synchronization and system information description signal transmitted to the terminal by the base station, as shown in FIG. 1, the transmission times between the terminals may still not correspond to each other. To solve this problem, zero padding (e.g., no signal transmission) with a variable length of u may be performed.

Figure 5:
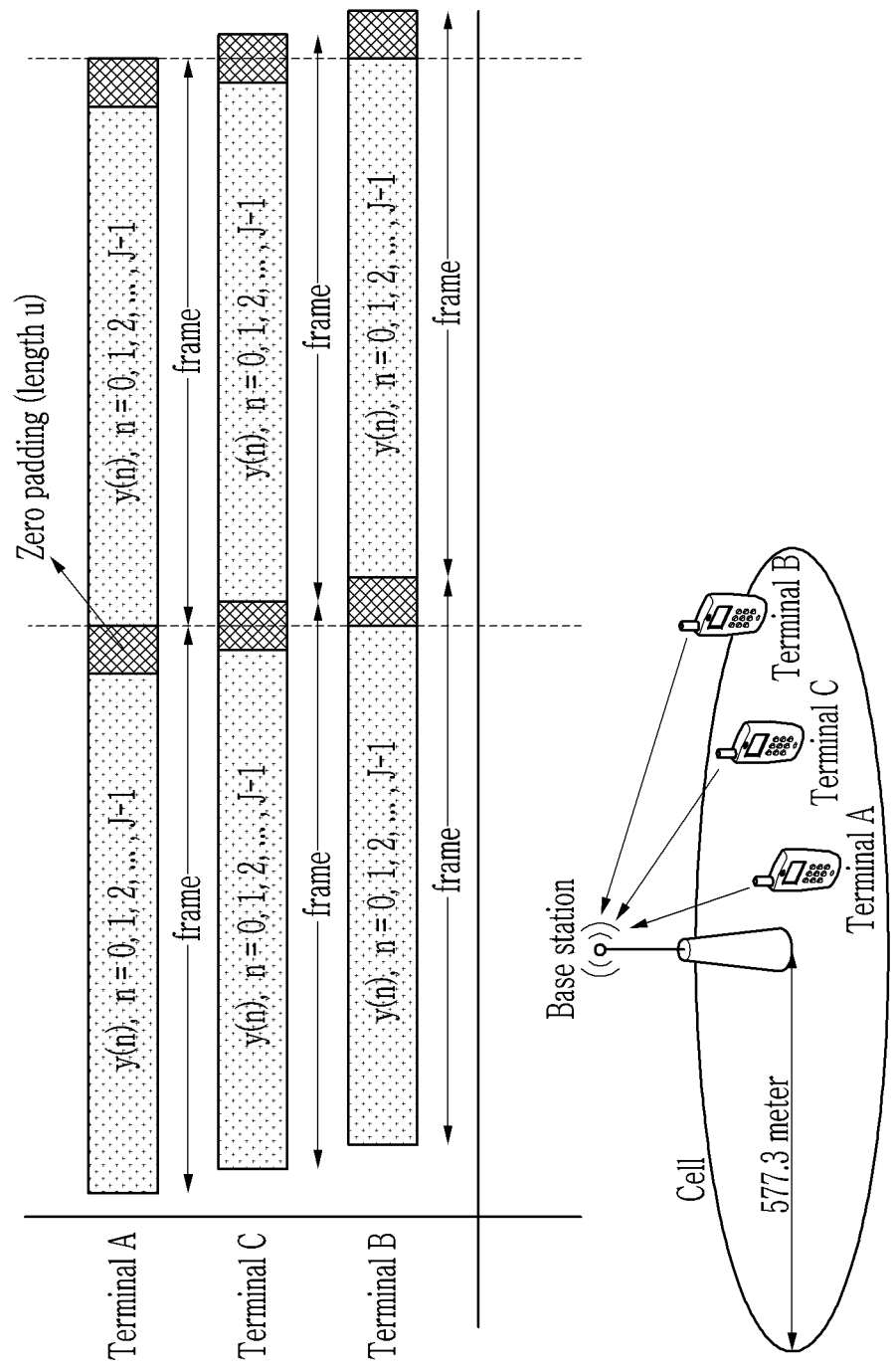
FIG. 5 shows a transmission time difference according to geographical positions and length requirements of zero padding according to an exemplary embodiment of the present invention.

FIG. 5 shows a transmission time difference according to geographical positions and length requirements of zero padding according to an exemplary embodiment of the present invention.

FIG. 5 shows a case in which a terminal A is provided nearest to the cell (or base station) and a terminal B is provided farthest from the cell (or base station) from among the terminals (e.g., terminal A, terminal B, and terminal C).

In FIG. 5, y( ) represents a signal finally transmitted by the terminal (e.g., terminal A, terminal B, and terminal C).

In detail, FIG. 5 shows a case in which, by controlling the length of zero padding (no energy) with the variable length of u, an end portion of a remainder except the zero padding from a frame (e.g., terminal B frame) received last at the base station is received in advance to or at the same time as an end portion of the zero padding included in a frame (e.g., terminal A frame) received earliest at the base station. For example, the terminal (e.g., terminal A, terminal B, and terminal C) may determine the length of the zero padding for the uplink data (e.g., the output of the modulator Tx130) based on the distance from the base station.

The length of the inserted zero padding depends on the setting of the system. For example, when a sampling rate of the symbol transmitted by the terminal is 240 Ksps, one sample may undergo zero padding.

The non-orthogonal transmission has been described with the uplink transmission as an example, which is, however, only exemplary. The non-orthogonal transmission according to an exemplary embodiment of the present invention is applicable to downlink transmission.

Figure 6:
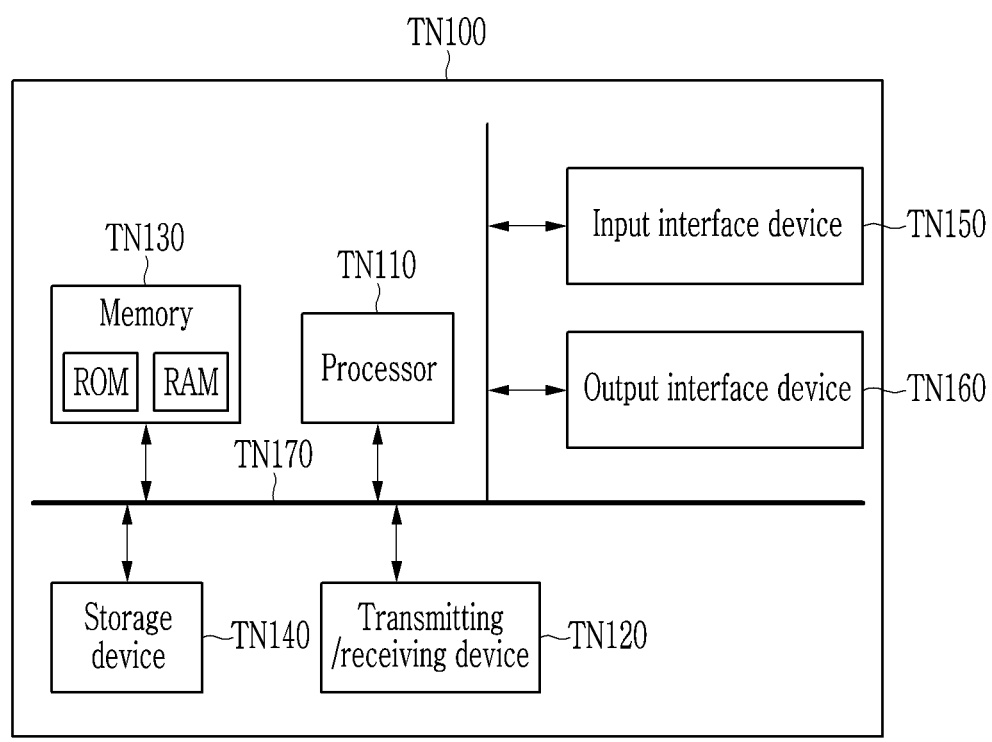
FIG. 6 shows a computing device according to an exemplary embodiment of the present invention.
Figure 7:
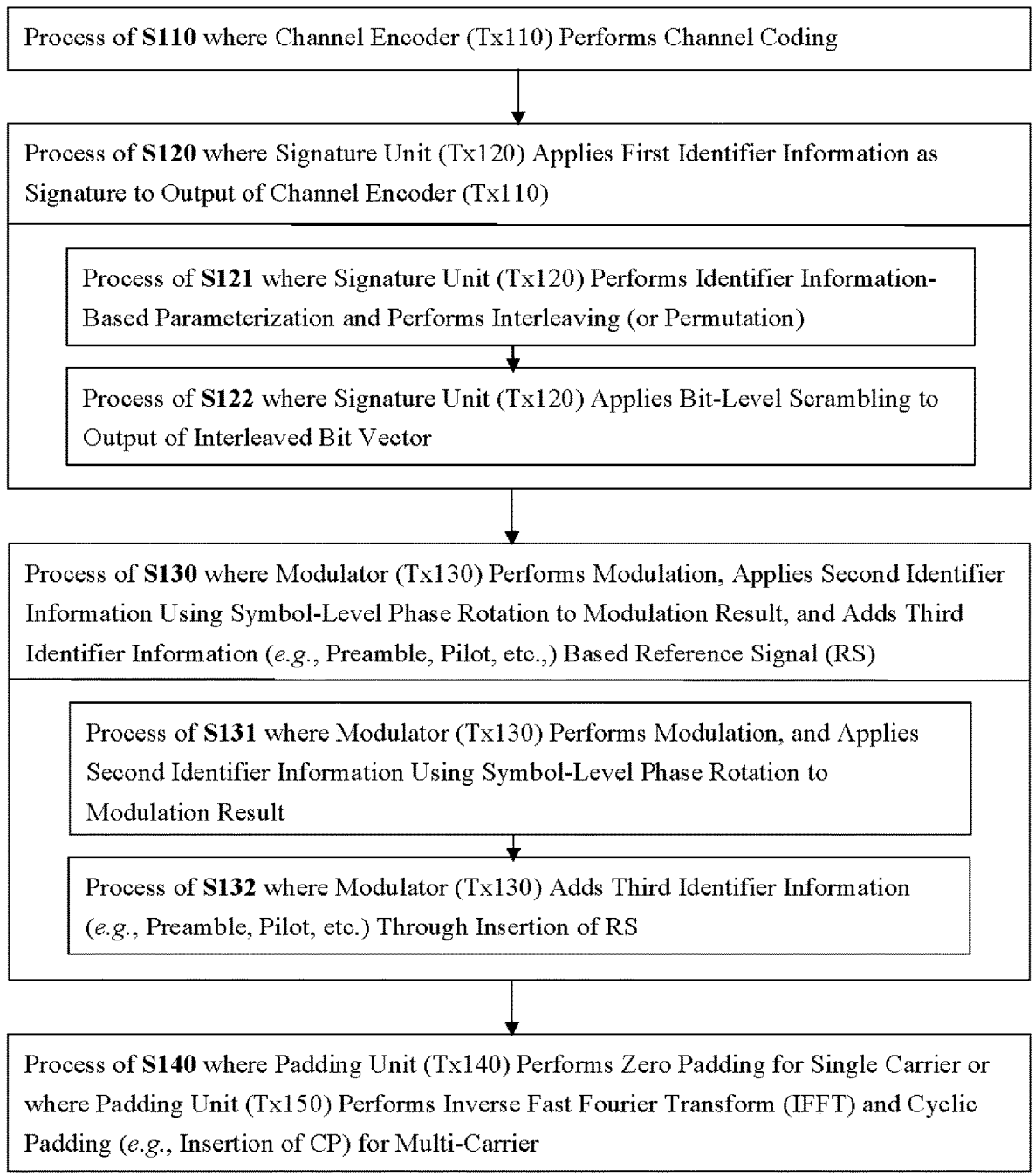
FIG. 7 shows a procedure for signal transmission of an uplink transmitter based on a non-orthogonal unique identifier in each of the terminals of FIG. 2 or 3 according to an exemplary embodiment of the present invention.
Figure 8:
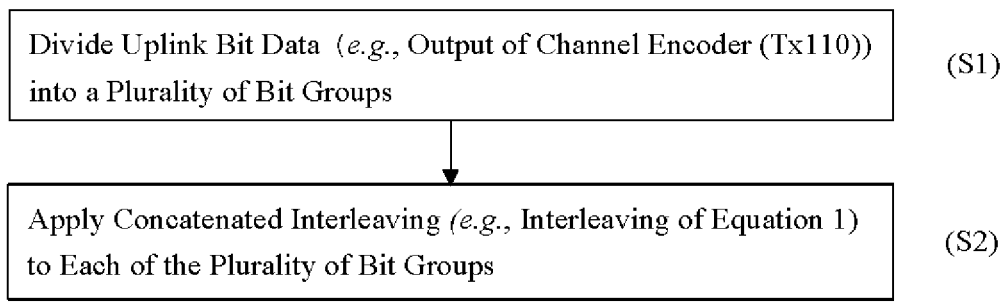
FIG. 8 shows an uplink transmission method of a transmitter based on a non-orthogonal unique identifier according to an exemplary embodiment of the present invention.
Figure 9:
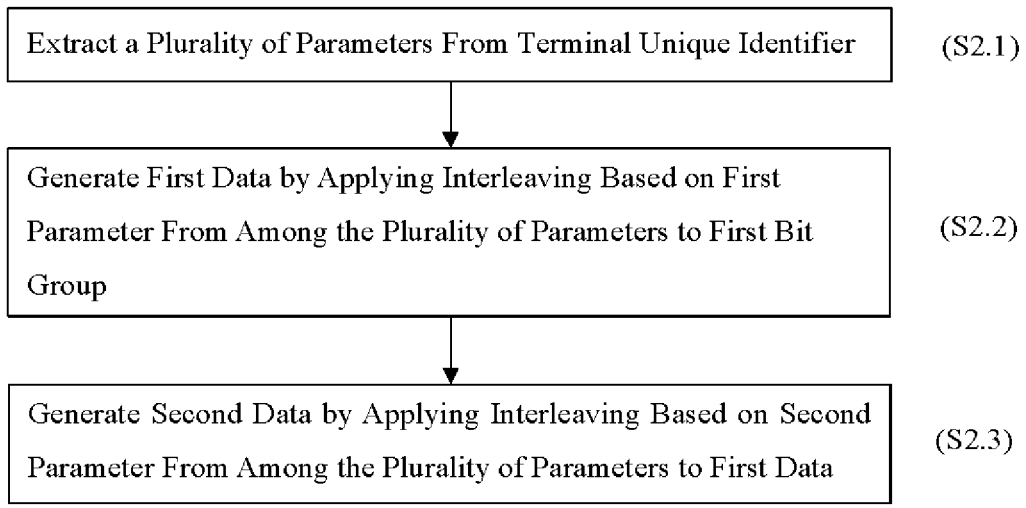
FIG. 9 shows more detailed operations of the operation S2 of FIG. 8 according to an exemplary embodiment of the present invention.
Figure 10:
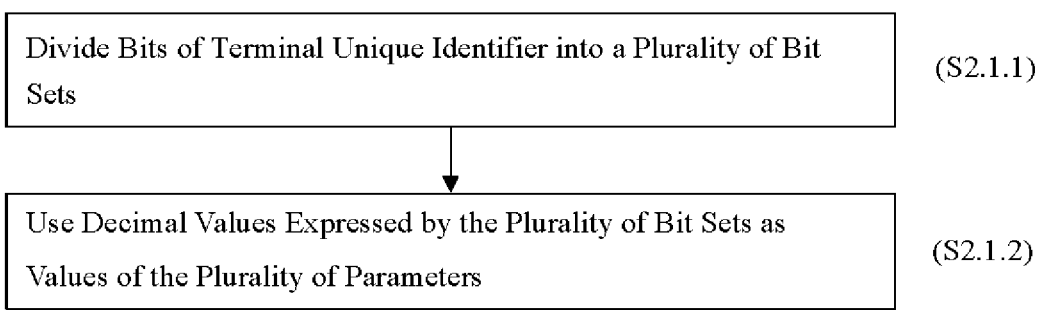
FIG. 10 shows more detailed operations of the operation S2.1 of FIG. 9 according to an exemplary embodiment of the present invention.

FIG. 6 shows a computing device according to an exemplary embodiment of the present invention. The computing device TN100 may be a base station or a terminal described in the present specification. In another way, the computing device TN100 may be a wireless device, a communication node, a transmitter, or a receiver.

In an exemplary embodiment of FIG. 6, the computing device TN100 may include at least one processor TN110, a transmitting/receiving device TN120 connected to a network and performing communication, and a memory TN130. The computing device TN100 may further include a storage device TN140, an input interface device TN150, and an output interface device TN160. Constituent elements included in the computing device TN100 may be connected to each other by a bus TN170, and may communicate with each other.

The processor TN110 may perform a program command stored in at least one of the memory TN130 and the storage device TN140. The processor TN110 may mean a central processing unit (CPU), a graphics processing unit (GPU), or an exclusive processor for performing methods according to an exemplary embodiment of the present invention. The processor TN110 may be configured to realize processes, functions, and methods relating to an exemplary embodiment of the present invention. The processor TN110 may control respective constituent elements of the computing device TN100.

The memory TN130 and the storage device TN140 may store various types of information relating to an operation of the processor TN110. The memory TN130 and the storage device TN140 may be configured with at least one of a volatile storage medium and a non-volatile storage medium. For example, the memory TN130 may be configured with at least one of a read only memory (ROM) and a random access memory (RAM).

The transmitting/receiving device TN120 may transmit or receive wired signals or wireless signals. The computing device TN100 may include a single antenna or a multi-antenna.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An uplink transmission method of a terminal, comprising:
dividing uplink data into a plurality of bit groups;
applying interleaving based on a unique identifier of the terminal to a first bit group of the plurality of bit groups; and
applying interleaving based on the unique identifier to a second bit group of the plurality of bit groups.

2. The uplink transmission method of claim 1, wherein the applying of interleaving based on the unique identifier to the first bit group includes:
extracting a plurality of parameters from the unique identifier;
generating first data by applying interleaving based on a first parameter from among the plurality of parameters to the first bit group; and
generating second data by applying interleaving based on a second parameter from among the plurality of parameters to the first data.

3. The uplink transmission method of claim 2, wherein the generating of first data includes performing interleaving based on the first parameter according to the following Equation 1:

$$d_0((a_3+i) \bmod L_{itlv}) = b(i)$$
$$d_1((L_{itlv}/2) \cdot (i \bmod 2) + \lfloor i/2 \rfloor) = d_0(i) \quad \text{[Equation 1]}$$

(b( ) is the first bit group, $a_3$ is the first parameter, $L_{itlv}$ is a length of an interleaving sequence, $d_1( )$ is the first data, and i is an index).

4. The uplink transmission method of claim 2, wherein the extracting of a plurality of parameters includes:
dividing bits of the unique identifier into a plurality of bit sets; and
using decimal values expressed by the plurality of bit sets as values of the plurality of parameters.

* * * * *